(12) United States Patent
Parks

(10) Patent No.: US 6,531,838 B2
(45) Date of Patent: Mar. 11, 2003

(54) FRONT-WHEEL-MOUNTED ELECTRIC MOTOR FOR A WHEELED VEHICLE

(75) Inventor: Lance C. Parks, Oak Park, CA (US)

(73) Assignee: Mobile Transport Technologies, Inc., Oak Park, CA (US)

( * ) Notice: Subject to any disclaimer, the term of this patent is extended or adjusted under 35 U.S.C. 154(b) by 31 days.

(21) Appl. No.: 09/844,894

(22) Filed: Apr. 26, 2001

(65) Prior Publication Data

US 2002/0079855 A1 Jun. 27, 2002

Related U.S. Application Data

(60) Provisional application No. 60/258,002, filed on Dec. 21, 2000.

(51) Int. Cl.$^7$ ............................................. B62K 11/00
(52) U.S. Cl. ...................... 318/139; 180/221; 180/222
(58) Field of Search ........................ 318/139; 180/218, 180/219, 220, 221, 222

(56) References Cited

U.S. PATENT DOCUMENTS

| | | | |
|---|---|---|---|
| 3,056,460 A | 10/1962 | Hanson | 180/31 |
| 3,800,898 A | 4/1974 | Griffin | 180/31 |
| 3,841,428 A | 10/1974 | Bialek | 180/74 |
| 3,891,044 A | 6/1975 | Tiede | 180/31 |
| 3,905,442 A | 9/1975 | O'Neill, Jr. | 180/33 |
| 3,978,936 A | 9/1976 | Schwartz | 180/31 |
| 4,087,108 A | 5/1978 | Winchell | 280/221 |
| 4,113,043 A | 9/1978 | Palmer | 180/33 |
| 4,175,629 A | 11/1979 | Kalajzich | 180/220 |
| 4,386,675 A | 6/1983 | Landon | 180/211 |
| 4,516,647 A | 5/1985 | Novak | 180/2.2 |
| 4,579,188 A | 4/1986 | Facer | 180/211 |
| 4,611,684 A | 9/1986 | Geschwender | 180/223 |
| 4,750,578 A | 6/1988 | Brandenfels | 180/13 |
| 5,078,227 A | 1/1992 | Becker | 180/221 |
| 5,491,390 A | 2/1996 | McGreen | 318/5 |
| 5,671,821 A | 9/1997 | McGreen | 180/220 |
| 5,853,058 A | * 12/1998 | Endo et al. | 180/65.1 |
| 6,231,283 B1 | * 5/2001 | Stowers | 410/9 |

FOREIGN PATENT DOCUMENTS

| | | |
|---|---|---|
| WO | WO 87/00500 | 1/1987 |
| WO | WO 92/21550 | 12/1992 |

\* cited by examiner

*Primary Examiner*—Bentsu Ro
(74) *Attorney, Agent, or Firm*—Christie, Parker & Hale, LLP

(57) ABSTRACT

An electric motor assembly to power a wheeled vehicle is disclosed comprising a support bracket having a horizontal mounting plate and a vertical mounting plate, each of which has edges and a central notch in one edge. An electric motor with an elongated spindle is adjustably secured to the bracket, and a battery capable of powering the motor is also mounted on the bracket. The notch of the horizontal plate receives a steering column of the vehicle in clamped engagement. The notch on the vertical mounting plate is sized to straddle and clear a front wheel of the scooter.

12 Claims, 4 Drawing Sheets

FRONT-WHEEL-MOUNTED ELECTRIC MOTOR FOR A WHEELED VEHICLE

CROSS REFERENCE TO RELATED APPLICATION

This application claims the benefit of U.S. Provisional Application Serial No. 60/258,002 filed Dec. 21, 2000.

BACKGROUND OF THE INVENTION

Much effort has gone into developing motorized scooters, bicycles, go-carts, personal-mobility devices for handicapped persons, and other traditionally user-powered vehicles. Such powered vehicles often suffer from disadvantages such as noise and pollution (e.g., gasoline powered engines), extra weight (e.g., heavy batteries and motor components), and awkward center-of-balance issues when weight is not well distributed on the frame of the vehicle. Furthermore, a vehicle fitted with such a motor often is very difficult to manage when the motor is not in use, and it may be difficult or impossible to remove the motor from the vehicle. A need exists for a clean, quiet, powerful and lightweight motor source that is compact and easy to install and remove if desired.

SUMMARY OF THE INVENTION

The motor assembly of the invention provides a lightweight and powerful electric motor and mounting assembly that is compact and can be permanently mounted or easily installed and removed.

The electric motor assembly of the invention comprises a support structure that has a horizontal mounting surface and a vertical mounting surface, each of the horizontal and vertical mounting surfaces having edges and a notch in one edge. The horizontal and vertical mounting surfaces need not be strictly horizontal and vertical as installed or with respect to each other; rather, it is important only that enough structure exists to mount the motor, the batteries, and the entire assembly onto the vehicle as described herein. Thus, "edge" of the mounting surfaces as used herein is intended to mean a side of the surface, whether that side is straight, curved, or uneven in any way.

The assembly also includes an electric motor with an elongated spindle extending from the armature. The motor is capable of turning the elongated spindle when supplied with power. The motor is powered by a battery which can be connected to the motor, and the support structure is adapted to have both the battery and the electric motor mounted on it. The notch on the vertical mounting surface is sized to straddle the edge of a driven wheel of the vehicle, and the notch on the horizontal mounting surface is sized to fit onto a selected mounting point. Advantages of this mounting assembly include the need for only simple hand tools to affix the assembly to the vehicle without the need for additional brackets or supports; a compact design with the motor and battery located on a single support; and a safety feature that the mounting assembly limits rotational freedom of the wheel.

BRIEF DESCRIPTION OF THE DRAWINGS

These and other features and advantages of the present invention will be better understood by reference to the following detailed description when considered in conjunction with the accompanying figures wherein.

DETAILED DESCRIPTION OF THE INVENTION

The vehicle motor assembly of the invention is designed to be front-wheel mounted on a vehicle, and easily installed and removed during manufacture and after-market. Alternatively, it can be permanently installed on the vehicle. The motor assembly has an electric motor with a drive shaft spindle that frictionally engages and drives the wheel when the motor is activated, and that spins freely with minimal friction when the motor is off. The motor is held on a mounting and support structure that adjustably places the drive shaft spindle in contact with the front wheel and that also holds the batteries. These features provide a simple fork mounting system that requires only basic hand tools for installation and removal, needs no extra supports or brackets, and allows the vehicle to be operated with the motor on, or by the user's physical energy in the normal way without increased resistance and very little added weight when the motor is turned off. The mounting system and motor of the invention can be used on any wheeled vehicle, such as a bicycle, tricycle, push scooter, go-cart, etc. A preferred embodiment is a mounting assembly and motor for a push scooter, and this embodiment will be described herein, without limiting the scope of the invention.

Figure 1:
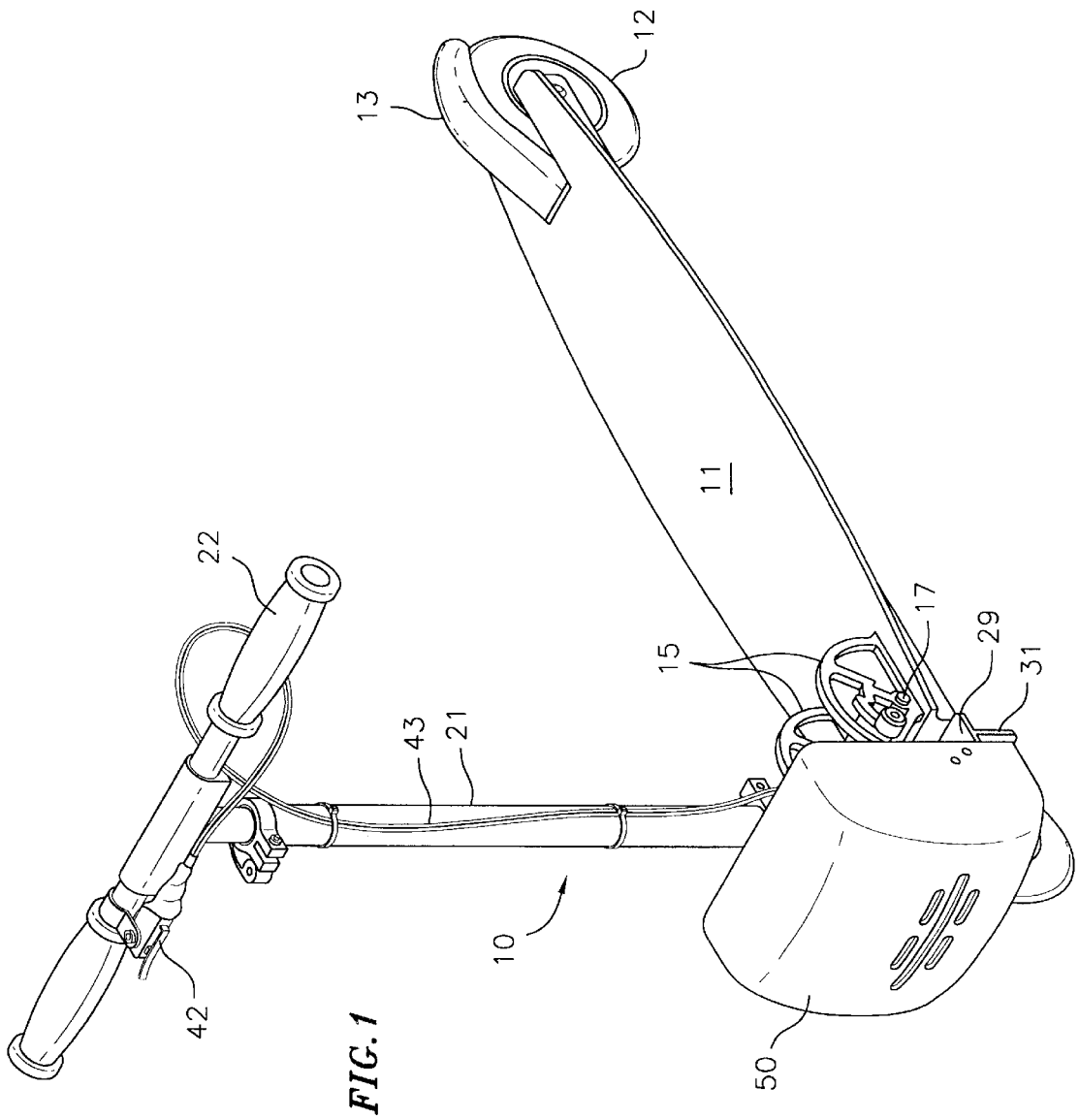
FIG. 1 is a perspective view of a scooter embodying the invention.
Figure 2:
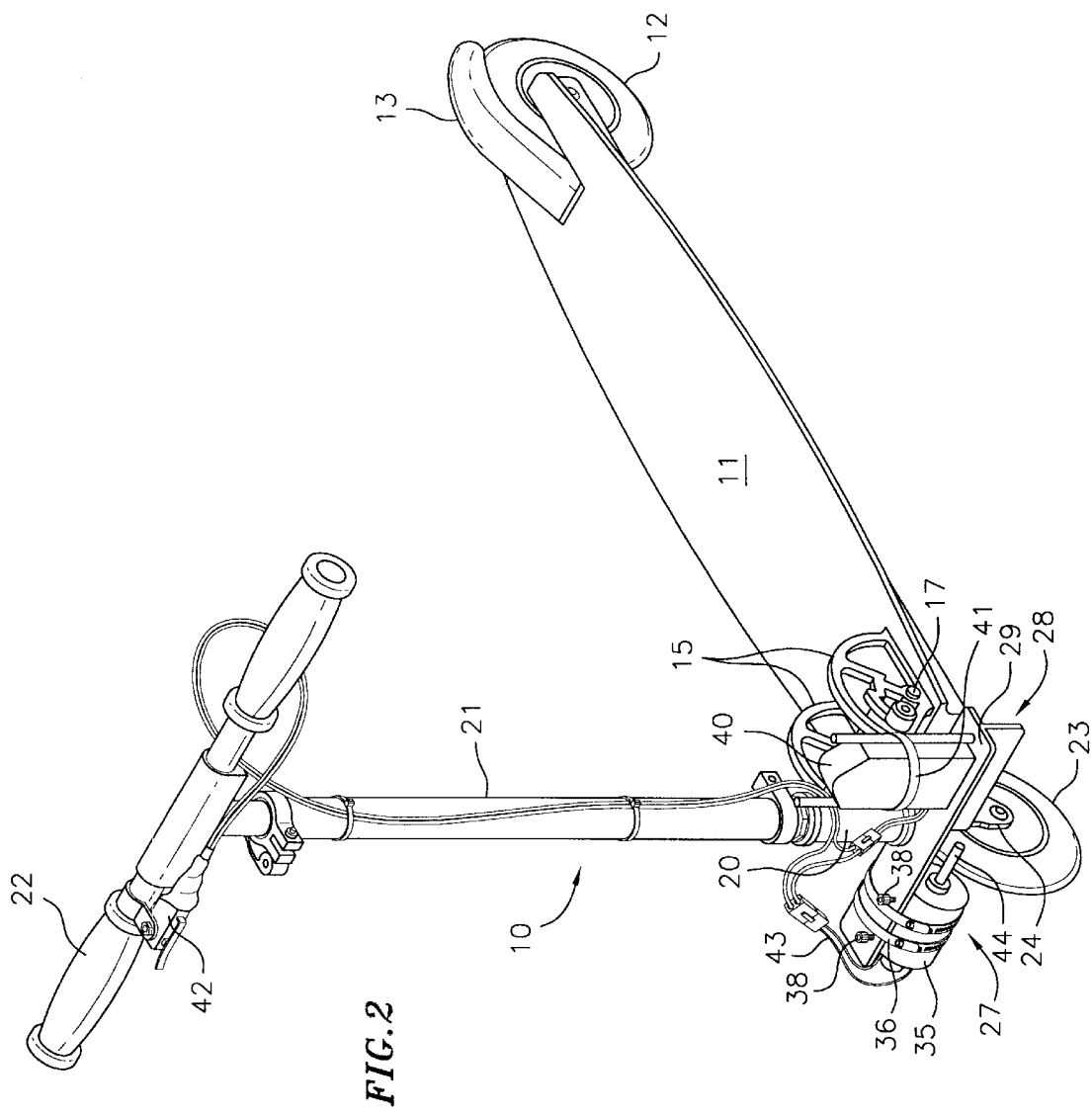
FIG. 2 is a perspective view similar to FIG. 1, but with a decorative and protective cover removed from the front of the scooter.

FIGS. 1 and 2 show a conventional push scooter 10 having an elongated foot-supporting platform 11 with a rear end which rotatably supports a rear wheel 12. A fender 13 is pivotably mounted on the platform over the rear wheel, and can be depressed by the rider's foot to act as a brake. A pair of part-circle guide plates 15 are rigidly secured to and extend upwardly from a front end of the platform, and a support member 16 is positioned between and extends upwardly and forwardly from the guide plates. A lower end of support member 16 (FIG. 4) is pivotable about a pin 17 extending between the guide plates. The support member is secured in a riding position as shown in the drawings by a clamp 18.

A tubular support 20 (FIGS. 2 and 4) is rigidly secured at the upper forward end of support member 16, and a steering column 21 is supported by and rotatably journaled through support 20. A steering handlebar 22 is secured at the top of the steering column, and a front wheel 23 of the scooter is rotatably supported on a fork 24 (FIGS. 3 and 4) secured at the bottom of the column. Releasing clamp 18 and actuating a release button 25 (FIG. 4) enables support member 16 and the steering column to be hinged downwardly about pivot pin 17 against platform 11 for compact storage or during carrying of the scooter. The components thus far described are conventional, and are parts which typify commercially available push scooters.

Figure 3:
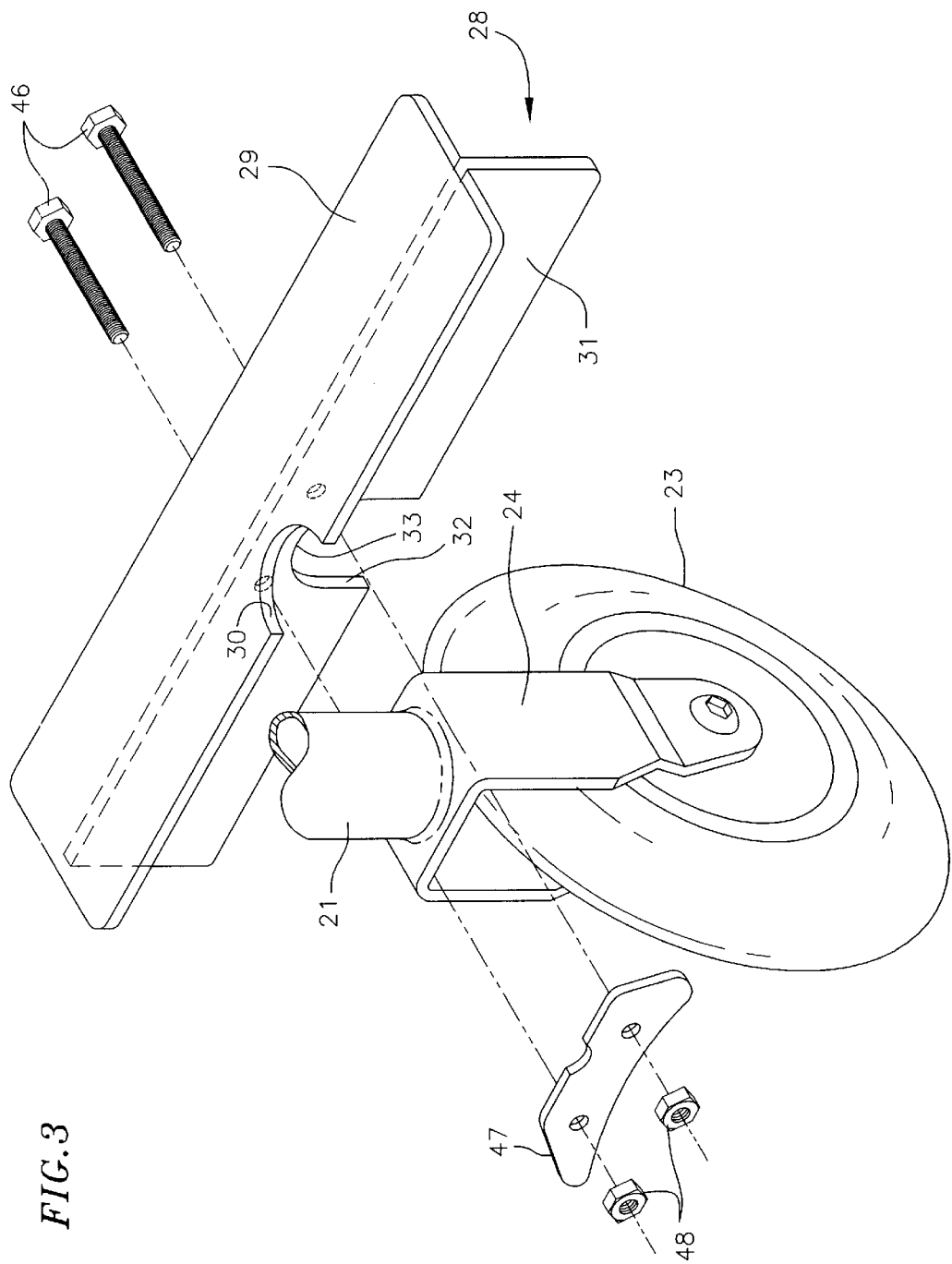
FIG. 3 is an exploded perspective view of the scooter front wheel and a support structure of the invention.
Figure 4:
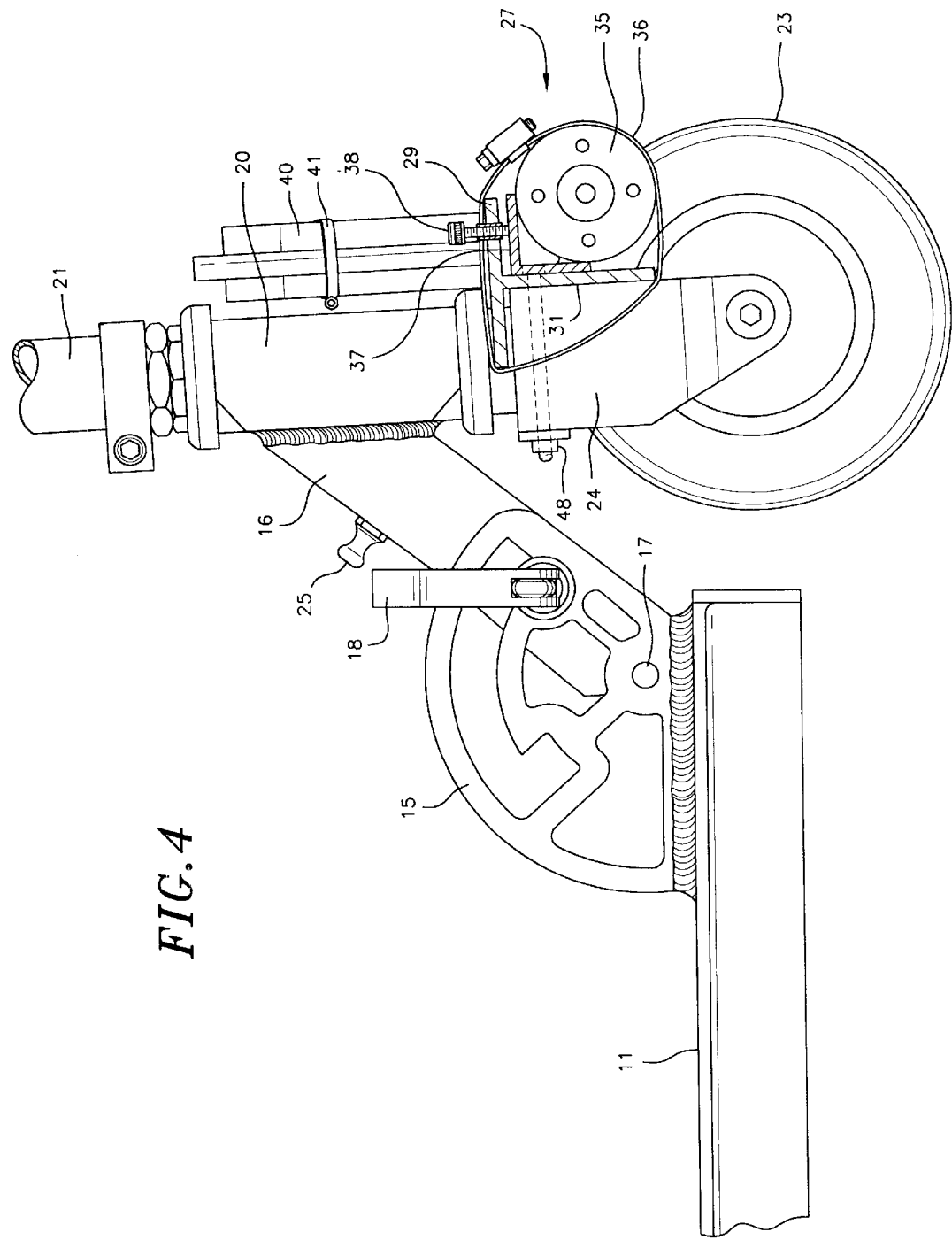
FIG. 4 is a side view of a front wheel assembly, and showing the support structure in section.

A drive motor assembly 27, best seen in FIGS. 2 and 4, is mounted dt the lower front end of scooter 10 adjacent front wheel 23. The assembly includes a rigid support bracket 28 of generally T-shaped cross section. As best seen in FIG. 3, bracket 28 has an upper mounting plate 29 with a central rearwardly extending notch 30 which is preferably semicircular. Extending from the underside of plate 29 in lower mounting plate 31 which has a central and upwardly extending notch 32 which preferably has a semicircular base 33. Notch 30 is dimensioned to make a snug fit around the lower end of steering column 21, and notch 32 is dimensioned to provide a clearance opening for front wheel 23 when assembly 27 is installed.

Assembly 27 further includes a generally cylindrical electric motor 35 which is secured by a clamping strap 36 beneath a first end of upper mounting plate 29 and in front of lower mounting plate 31. The motor seats in a right-angle saddle 37, the vertical position of which is adjustable by a pair of adjusting screws 38 threaded through the upper plate to bear on the top of the saddle (FIG. 4). Alternative means for securing the motor and bracket can of course be used.

An electric battery 40 is mounted on a second end of upper mounting 29, and is held by a clamp 41. The battery is connected to the motor through a handlebar-mounted switch 42 by a cable 43. The motor has a drive shaft or spindle 44 extending therefrom. When used on a scooter, the spindle is preferably aluminum which has good heat-dissipating properties, and is also preferably smooth for gripping, but non-abrasive contact with a solid urethane wheel with which scooters are typically equipped.

Assembly 27 is easily installed on the scooter by fitting upper plate 29 of the support bracket against steering column 21, with the steering column received in notch 30. Front wheel 23 makes a clearance fit within notch 32 of the lower mounting plate. The assembly is then clamped in place by a pair of threaded bolts 46 (FIGS. 3 and 4) extending through clearance openings in lower plate 31 and a clamp plate 47, and tightened into nuts 48 to secure the clamp plate against the front of fork 24. Adjusting screws 38 are advanced to place motor spindle 44 in frictional engagement with the perimeter of front wheel 23. If the scooter is being pushed by the rider without motor assistance, the adjusting screws can be retracted, or the motor spindle can rotate freely when driven by the front wheel. Assembly is completed by clamping an optional decorative and protective cover 50 secured to the front of the scooter over assembly 27.

Motor 35 can be of any electric type that has a high efficiency, preferably over 50%, more preferably over 65%, and most preferably 80% or above. Particularly preferred motors are d-c motors using 12–24 volt nickel-cadmium batteries which are rechargeable, reduced in size, and have greater capacity than other batteries. Electric motors of this type generally have a ferrite core or high performance cobalt magnets, and operate at high RPMs. Suitable electric motors can be obtained, for example, from AstroFlight, Inc. (Marina Del Rey, Calif.).

The torque or gear ratio of the drive system is determined by the diameter of the motor spindle. Preferably, the spindle is selected so that the motor has a relatively low gear ratio. Preferably, the spindle size is between about 3/16 of an inch to 3/4 of an inch, more preferably between about 3/8 to 1/2 of an inch. A spindle of about 1/2 inch diameter is suitable for light loads, such as a scooter used by children, and will have a longer ride time on a single battery. However, for heavier loads such as an adult, a spindle of about 3/8 -inch diameter gives sufficient torque and battery longevity. Motors with these spindles are generally about 80–90% efficient, compared to the roughly 40–42% efficiency of a standard fan motor such as is used on many motorized scooters and bicycles.

The preferred motor for use in the invention is usually about 1/8 to 1 horsepower, depending on the size of the vehicle and occupant to be moved, but can be of any appropriate power. In the scooter embodiment depicted herein, the motor is 1/8 hp and can power the scooter and an adult rider. An internal or external fan for the motor can optionally be used to cool the motor drive for improved efficiency.

Power for these motors is usually provided by a series of nickel-cadmium cells made up into packs. Six and seven cell packs are most common, but larger cobalt motors may require up to 28 or more cells. These batteries are light and can be recharged quickly in about 15 to 60 minutes. Alternatively, 12–24 volt lead-acid and sealed batteries can be used, or titanium batteries for longer run and more power. These are also rechargeable (overnight) and with the higher capacity will give much longer run times.

Battery 40 is mounted on the support bracket to be easily accessible for rapid battery removal and replacement. Preferably, the mounting site is on the top side of horizontal mounting surface 16, which is flat or shaped to accommodate one or more batteries. The battery clamp is designed to provide stable support for the battery and still allow it to be easily removed. A second battery could be placed on the opposite side of the horizontal mounting surface as well. Even with two batteries, the motor assembly generally will weigh no more than about ten pounds, and in the configuration depicted in the drawings, weighs about four pounds (structural support, battery, and motor included). The motor alone generally weighs between about 4–14 oz.

In an alternative embodiment, the battery mounting structure is a tongue-and-groove mounting system that mates with a corresponding tongue-and-groove structure on the battery itself. This simple system is especially preferred, because batteries useful in the invention often incorporate such tongue-and-groove structures in order to slide onto rechargers for recharging. Having a corresponding part as the battery mounting structure means that no tools at all are required for installing the battery or removing it for recharging. The user simply slides the fresh battery onto the mounting structure, attaches it to a connector leading to the motor, and the system is ready for use. To remove the battery, the user disconnects the battery from the motor and slides it off. Alternatively, a simple plug-in adaptor can supplement or serve as both a connector and support.

The support bracket and motor are mounted above the wheel of the vehicle. On vehicles such as bicycles, scooters, and the like, the support structure is mounted on or over the front-wheel fork of the vehicle such that horizontal notch 30 fits over and comes to rest above the fork; vertical notch 32 straddles the wheel. As an alternative to clamp plate 47, the scooter could be manufactured with a clamping plate permanently affixed to the fork to be pre-adapted for accepting the motor assembly. Alternatively, the entire drive-motor assembly may be permanently affixed to the frame of the vehicle, e.g., during manufacture of the vehicle, for a permanently powerable vehicle.

The assembly is easily assembled in a short time using only simple tools. This configuration still allows the steering shaft and handle of the scooter to rotate freely to make turns. However, the support bracket provides an important safety feature as well, in that it prevents the scooter's front wheel from turning through 360 degrees by acting as a "bump stop" when the handle is rotated sufficiently that upper plate 29 hits and is stopped by guide plates 15 or support member 16. This prevents a user from inadvertently turning the handle so hard or far that the scooter moves out from underneath the user.

Optimal contact of the motor spindle and front wheel is that which provides sufficient frictional engagement between the spindle and the wheel to turn the wheel without slipping, but also without placing undue radial stress on the spindle. The adjustment means need not be threaded pins, and can be any manual or self-adjusting system which allows the spindle and motor to be raised and lowered to engage the wheel, for example, hydraulic or spring-loaded tensioning devices, slidable adjustors, and the like. The mechanism is easy to adjust, so that it can be readily adjusted as the wheel wears, for example.

Because the motor and battery or batteries are mounted close together on the support structure, they are easy to connect together with a short connector. The motor is wired to an on/off switch, which can be mounted anywhere on the vehicle that is convenient for the user. For example, in a push scooter, the switch is preferably placed on the handlebar, and a simple wiring harness with an extendible link mounts to the outside of the steering column so that wiring does not get in the way of the rider and does not interfere with handle height adjustment or the collapsability of the scooter. The switch can be of any type, such as a momentary contact switch requiring constant user pressure to remain activated, or a finger-activated switch to selectively turn the motor on or off optionally, a low-power light may be provided in the assembly for safety or decoration. The light can draw from the battery or from self propulsion of the scooter by the user. When the motor is turned on, the light can also be turned on, and when the motor is off, then propulsion by the user turns the spindle on the motor which serves as a generator, generating sufficient power to light the light.

Significant advantages of the motor and mounting assembly of the invention include that the entire unit is small and lightweight, and is contained in a single mounting. This makes it easy to carry and store. The unit is placed low on the scooter or other vehicle, so that it does not interfere with the rider and does not unsafely raise the center of gravity of the vehicle. The support bracket mounts over the wheel, with no additional supports or brackets required, and is attached and removed easily with hand tools.

The front wheel installation allows the scooter to operate as an electric scooter or a push scooter, without removing the motor assembly or raising the spindle off of the wheel like prior-art motorized vehicles. Furthermore, as pertains particularly to a scooter, the front wheel mounting location allows the rider to have unfettered access to the rear friction braking system, so this important safety feature is not impaired in any way by the motor or batteries. The mounting assembly allows the user to quickly and easily change batteries, and the small size of the batteries permit the user to carry one or more spare batteries along if desired. Finally, the front-wheel drive system is more efficient and enhances performance.

What is claimed is:

1. An electric motor assembly to power a wheeled vehicle having a front wheel, the assembly comprising:
   a support bracket adapted for attachment to the vehicle, and comprising a horizontal mounting surface and a vertical mounting surface, each of the horizontal and vertical mounting surfaces having edges and a notch in one edge;
   an electric motor having an elongated spindle, the motor being capable of turning the elongated spindle; and
   a battery capable of powering the motor and of being connected thereto;
   wherein the support bracket is adapted to receive and support the battery and electric motor, and further wherein the notch on the vertical mounting surface is sized to straddle and clear the vehicle front wheel.

2. The assembly of claim 1 wherein the vehicle has a steering column associated with the front wheel, and the notch of the horizontal mounting surface is configured to fit against and move with the steering column.

3. The assembly of claim 2 wherein the motor is adjustably mounted on the bracket to place the motor spindle in frictional contact with a perimeter of the front wheel.

4. The assembly of claim 3, and further comprising a clamp for securing the support bracket, motor and battery to the vehicle adjacent the front wheel.

5. The assembly of claim 4 wherein the vehicle is a scooter.

6. The assembly of claim 5 wherein the bracket is arranged to prevent 360-degree rotation of the steering column.

7. A motor-drive assembly for propelling a scooter, the scooter having an elongated platform with front and rear wheels, the front wheel being rotatably supported in a fork secured at the bottom of a rotatable steering column of the scooter, the assembly comprising:
   a support bracket having an upper mounting plate with a first central notch, and a lower mounting plate secured to and extending downwardly from the upper mounting plate, the lower plate having a central downwardly opening second notch;
   an electric motor adjustably secured to an underside of the upper plate, the motor having a drive spindle extending therefrom;
   a battery secured to the upper plate and electrically connected through an actuating switch to the motor; and
   a clamp for securing the assembly to the scooter steering column with an upper part of the front wheel making a clearance fit within the second notch, and with the steering column received in the first notch to be secured to the bracket, with the motor spindle in adjustable frictional contact with the front wheel.

8. The assembly of claim 7 wherein the support bracket is elongated to extend on opposite sides of the steering column, and is generally T-shaped in cross section.

9. The assembly of claim 8 wherein the support bracket is an integral member.

10. The assembly of claim 8, and further comprising an adjusting screw threaded through the upper plate for adjusting the position of the motor spindle with respect to the front wheel.

11. The assembly of claim 8 wherein the support bracket when secured to the scooter steering column is arranged to limit rotation of the steering column to prevent overturning of the column.

12. The assembly of claim 8 wherein the motor spindle and scooter front wheel have parallel axes of rotation.

* * * * *